United States Patent Office 3,128,231
Patented Apr. 7, 1964

3,128,231
SUPPRESSION OF ADVENTITIOUS TISSUE CULTURE CONTAMINANTS WITH SELECTED SOLUBLE SALTS OF TRIVALENT METAL CATIONS
Joseph L. Melnick and Craig Wallis, Houston, Tex., assignors to Baylor Medical Foundation, Houston, Tex., a non-profit corporation of Texas
No Drawing. Filed Apr. 11, 1962, Ser. No. 186,618
4 Claims. (Cl. 167—78)

This invention relates to animal cells grown in culture and to viruses grown in them, for example, to monkey kidney cells and to vaccines made in them, and to other primary animal cell cultures, as well as to stable cells grown in serial culture.

Cells grown in tissue culture, especially obtained from kidneys of monkeys, often are spontaneously contaminated with filterable agents. These adventitious agents may sometimes be recognized during the growth of the culture by the cytopathic effects produced. Multiplication of an adventitious virus or filterable agent may be followed by what appears to be the spontaneous destruction of the cultured cells. Sometimes the presence of an adventitious agent goes unrecognized and the cultures are used for growing selected viruses, for example, for vaccines, for diagnostic reagents, and for other purposes. In such cases the desired harvests are contaminated with the adventitious agents.

Our earlier copending application, Serial No. 128,953, filed August 3, 1961, now abandoned, and its continuation-in-part application Serial No. 143,038, filed October 5, 1961, discloses procedures for removing adventitious viruses from virus harvests to be used as vaccines and for other purposes, among other things. It would be highly desirable, however, to suppress these spontaneous adventitious agents from developing in animal cultures. The present invention is based upon the surprising discovery that spontaneous adventitious agents of animal cultures can be suppressed from developing.

It is therefore an object of the present invention to suppress the formation of adventitious agents in animal cultures.

It is yet a further object to suppress the formation of spontaneous adventitious agents in animal cultures so that vaccines, diagnostic reagents, and other products grown in the cell cultures will be of higher purity.

Yet a further object of the present invention is the provision of healthy cell cultures of lessened contamination and of increased longevity.

The present invention is based upon the discovery that the addition of a trivalent metal cation such as those of aluminum, chromic ions, ferric ions, to nutrient media suppresses the development of adventitious filterable agents and their deleterious effects on the cultures or on the vaccines or diagnostic reagents or on virus harvests made in such cultures. Thus, cultures from sources containing latent viruses may be cultivated with media containing trivalent metal cations and the cells grow rapidly and have a longer period of usefulness or longevity than cells without the added trivalent metal cations.

The trivalent cations are preferably used as a soluble salt. Among the soluble salts of trivalent metal cations which may be used are aluminum chloride or sulfate, chromic chloride or sulfate and ferric chloride or sulfate.

The medium may be any suitable medium. For example, a well known medium is Melnick's medium. This medium contains, per liter, 5.0 gm. lactalbumin enzymatic hydrolysate, 20 ml. calf serum, 8.0 gm. NaCl, 0.4 gm. KCl, 0.2 gm. $MgSO_4.7H_2O$, 0.14 gm. $CaCl_2$, 0.06 gm. $Na_2HPO_4$, 0.06 gm. $KH_2PO_4$, 0.2 gm. $NaHCO_3$, 1 gm. glucose. Other well known mediums are Eagle's basal medium and Medium No. 199. In addition other compositions of nutrients and salts which allow cells to grow or be maintained in living culture or both may be used. The foregoing mediums, as well as others, are described in Diagnostic Procedures for Virus and Rickettsial Diseases, Second Edition, published by American Public Health Association, New York, New York, in 1956.

The cells dispersed in the medium may be of any desired animal type, for example, monkey kidney cells, dog kidney cells, pig kidney cells, calf kidney cells, human kidney cells and the like; also, mouse, chick, and human embryo fibroblast and mixed cell cultures and the like. The cells may be dispersed by trypsinization methods such as those described in the foregoing publication. The cells are grown in the medium in bottles, flasks, or test tubes as described in this publication.

Thus, the cell cultures may be of any desired type and when treated according to the present invention the growth of adventitious agents which otherwise occurs is suppressed. Not only are viruses, such as foamy virus, Herpesvirus, simiae or B virus, that are found spontaneously in cell cultures, such as monkey kidney cell cultures suppressed, but the losses of cultures intended for use are considerably reduced.

In addition, the maintenance medium may contain the soluble salt of a trivalent metal cation as previously mentioned. This is not essential, however, but does assist in suppressing adventitious agents.

The soluble salt of a trivalent metal cation is preferably added as a dilute solution and the final concentration of the salt is within the range of from about 0.02 millimolar to about 1.0 millimolar.

The following examples are given to illustrate the present invention and are not to be regarded as a limitation of the invention, many variations of which are possible without departing from its spirit or scope.

*Example I*

A 2 molar solution containing 48.3 gm. of $AlCl_3.6H_2O$ per 100 ml. was made and sterilized by filtration or by autoclaving at 15 pounds pressure for 15 minutes. This was diluted 1 to 100 in sterile distilled water to make a 0.02 molar solution. Ten ml. of the 0.02 molar solution was added to 990 ml. of Melnick's medium so that the medium contained 0.2 millimolar $AlCl_3$. Monkey kidney cells were dispersed in this growth medium by trypsinization and the cells were grown in bottles, flasks or test tubes, all as described in the previously-mentioned publication.

*Example II*

The cultures of Example I were grown to form a monolayer, which took from 4 to 6 days and the growth medium was replaced with an ordinary maintenance medium, to which $AlCl_3$ was added to make its final concentration 0.2 $mM.AlCl_3$, which suppressed the growth of adventitious agents. The cultures may now be used for growing or assaying polioviruses or other enteroviruses, adenoviruses, myxoviruses, pox viruses, and the like. As an alternate, the $AlCl_3$-growth medium was removed by two rinsings with an $AlCl_3$-free balanced saline solution before the addition of $AlCl_3$-free maintenance medium.

In both cases, the resultant monolayer was ready for inoculation, for preparation of the desired virus harvests, or for virus assay.

*Example III*

This example is the same as Examples I and II except that sufficient $AlCl_3$ was added to the growth medium as in Example I and to the maintenance medium as in Example II so that the final concentration thereof was 1.0 mM. $AlCl_3$.

*Example IV*

This example is the same as Examples I and II except that a quantity of $AlCl_3$ was added to the growth medium as in Example I and to the maintenance medium as in Example III so that the final concentration thereof was 0.02 mM. $AlCl_3$.

*Example V*

This example is the same as Examples I and II except that aluminum sulfate and chromic sulfate were each substituted for the aluminum chloride in final concentrations of 0.02, 0.2 and 1.0 mM.

*Example VI*

This example is the same as Examples I and II except that ferric chloride and ferric sulfate were each substituted for aluminum chloride in final concentrations in both cases of 0.02, 0.2 and 1.0 mM.

*Example VII*

After the cultures had developed monolayers as described in the preceding examples, they were all ready for use or distribution to other laboratories. They may be shipped either with the original nutrient fluid or after the fluid has been drained, or after the original fluid has been drained and replaced with additional growth or maintenance medium, which may or may not contain trivalent cations.

In all the preceding examples the growth of viruses, such as foamy virus, Herpesvirus, simiae or B virus were suppressed and pleuropneumonia-like organisms (PPLO) were also inhibited from growing and producing deleterious effects on the animal cells in the cultures. Such PPLO strains may arise in cultures from material added to the cultures, such as the animal sera used in nutrient media, or they may be present as contaminants of the original tissue used for initiating the culture, or they may be air borne contaminants.

In many cases, cells in culture degenerate or slough or do both from the glass without any apparent reason. Treatment of these cultures in accordance with this invention, as exemplified in the foregoing examples, prevented this from happening.

The cultures may be used for propagating viruses for many purposes, for example, for virus vaccines, for immunizing antigens, for diagnostic antigens, without removing the trivalent cations from the culture medium. If desired, however, the trivalent cations may be readily removed from the cultures by pouring off the trivalent cation medium and rinsing the cultures with a trivalent cation-free balanced salt solution as previously described. Both the washed or unwashed cultures may also be used for preparing virus harvests, as for example, for adenovirus vaccine, for measles vaccine, for poliovaccines, or for other vaccines of the inactivated or the live types, and for diagnostic reagents.

When used for quantitative viral assays, cultures treated according to the present invention are more resistant to deleterious changes under agar overlays. Thus virus-induced plaques are measured more readily and viral assays are more reliable and reproducible in cultures treated according to the present invention than in any comparable cultures grown without being so treated.

In our copending application filed October 5, 1961, Serial No. 143,038, being a continuation-in-part of our application Serial No. 128,953, filed August 3, 1961, now abandoned in favor of our copending application, there is described and claimed compositions of matter and processes having to do with live viral vaccines. These compositions of matter and processes of our copending application are not described and claimed in this application.

The present invention therefore is well suited and adapted to attain the objects and ends and has the advantages and features mentioned as well as others inherent therein.

While presently-preferred examples of the invention have been given for the purpose of disclosure, changes may be made therein which are within the spirit of the invention and the scope of the appended claims.

What is claimed is:

1. The process which comprises adding aqueous solutions containing at least one member of the group consisting of aluminum chloride, aluminum sulfate, chromic chloride, chromic sulfate, ferric chloride and ferric sulfate to a tissue culture medium for cell cultures suitable for the production and for the safety testing of viral vaccines containing at least one live ribonucleic acid-containing tissue-culture propagated enterovirus, attenuated to avirulence to man, in concentration effective to suppress adventitious tissue culture contaminants.

2. The process which comprises adding aqueous solutions containing at least one member of the group consisting of aluminum chloride, aluminum sulfate, chromic chloride, chromic sulfate, ferric chloride and ferric sulfate, to a tissue culture medium containing cells suitable for the production and for the safety testing of viral vaccines and containing at least one live ribonucleic acid-containing tissue-culture propagated enterovirus, attenuated to avirulence to man, said cations being added in concentrations effective to suppress adventitious tissue culture contaminants.

3. A tissue culture medium consisting of a medium suitable for the production and for the safety testing of viral vaccines prepared by adding to said medium an aqueous solution containing at least one member of the group consisting of aluminum chloride, aluminum sulfate, chromic chloride, chromic sulfate, ferric chloride and ferric sulfate in concentrations effective to suppress adventitious tissue culture contaminants.

4. A tissue culture containing at least one live ribonucleic acid-containing enterovirus prepared by adding to the tissue culture an aqueous solution containing at least one member of the group consisting of aluminum chloride, aluminum sulfate, ferric chloride, ferric sulfate, chromic chloride and chromic sulfate in concentrations effective to suppress adventitious tissue culture contaminants.

References Cited in the file of this patent

UNITED STATES PATENTS 3,096,249     Prigal _____ July 2, 1963

OTHER REFERENCES

Murray: J. of Exp. Zoology, May 5, 1927, pages 467–475.

Schaeffer et al.: Purification of Poliomyelitic Virus, Archives of Pathology, vol. 15, pp. 221–226 (1933).

Waksman: Streptomycin, pages 561–579, pub. by Williams and Wilkins Co., Balt., 1949.

Murray: Bibliography of the Research in Tissue Culture, 1884–1950, vol. I, page 45, pub. 1953 by Academy Press, Inc., N.Y.C.

Gard World Health Organization Monograph Series, No. 26, 1955, pages 230–235.

Hu et al.: J. Inv. Dermat. January 1956, pp. 23–39.

Wallis and Melnick: Stabilization of Poliovirus by Cations, Texas Rep. Biol. Med. 19, pp. 683–700, Fall 1961.

Wallis and Melnick: Cationic Inactivation of Vacuolating Virus (SV 40) in Poliovirus Suspensions, Texas Rep. Biol. Med. 19, pp. 701–705, Fall 1961.

Wallis and Melnick: Magnesium Chloride Enhancement of Cell Susceptibility of Poliovirus, Virology 16, pp. 122–132, February 1962.

Wallis et al.: An Aluminum Marker for the Differentiation and Separation of Virulent and Attenuated Polioviruses, J. Exp. Med., vol. 115, pp. 763–775, April 1, 1962.

Wallis and Melnick: Cationic Stabilization—a New Property of Enteroviruses, Virology 16, pp. 504–506, April 1962.

Wallis and Melnick: Effect of Organic and Inorganic Acids on Poliovirus at 50° C., Proc. Soc. Exp. Biol. and Med. III, pp. 305–308, November 1962.